(12) United States Patent
Bacher et al.

(10) Patent No.: US 7,538,153 B2
(45) Date of Patent: May 26, 2009

(54) COMPOUND OF A POWDERY COATING AGENT

(75) Inventors: Andreas Bacher, Burghausen (DE); Karl Ernst Fickert, Altötting (DE); Theo Mayer, Julbach (DE)

(73) Assignee: Wacker Chemie AG, Munich (DE)

( * ) Notice: Subject to any disclaimer, the term of this patent is extended or adjusted under 35 U.S.C. 154(b) by 566 days.

(21) Appl. No.: 10/553,924

(22) PCT Filed: Apr. 21, 2004

(86) PCT No.: PCT/EP2004/004233

§ 371 (c)(1),
(2), (4) Date: Oct. 21, 2005

(87) PCT Pub. No.: WO2004/098898

PCT Pub. Date: Nov. 18, 2004

(65) Prior Publication Data

US 2006/0194006 A1    Aug. 31, 2006

(30) Foreign Application Priority Data

May 8, 2003   (DE) ............................... 103 20 629
May 15, 2003  (DE) ............................... 103 21 941

(51) Int. Cl.
*C08L 29/04*    (2006.01)
(52) U.S. Cl. .................... 524/503; 427/427.4
(58) Field of Classification Search .................. 524/503
See application file for complete search history.

(56) References Cited

U.S. PATENT DOCUMENTS 4,617,239 A    10/1986   Maruyama et al.
4,783,375 A *  11/1988   Hashimoto et al. ....... 428/32.87
5,342,897 A *   8/1994   Franzman et al. ............ 525/221
6,075,075 A *   6/2000   Dragon et al. .................. 524/2
7,052,773 B2 *  5/2006   Bacher et al. ................ 428/514
2001/0024713 A1   9/2001   Quintens et al.
2002/0094421 A1   7/2002   Quintens et al.
2002/0192436 A1* 12/2002   Voeght et al. ................ 428/195
2004/0122131 A1*  6/2004   Brown et al. ................. 523/160

FOREIGN PATENT DOCUMENTS

| DE | 35 19 575 A1 | 12/1985 |
| DE | 102 32 666 A1 | 2/2004 |
| EP | 0 997 314 A1 | 5/2000 |
| EP | 1 080 940 A2 | 3/2001 |
| EP | 1 127 706 A1 | 8/2001 |
| JP | 10 119430 | 5/1998 |

OTHER PUBLICATIONS http://www.poval.jp/english/poval/s_grades/sg_r.html.*
Derwent Abstract corres. to DE 10 232 666 [AN 2004-111486].
Derwent Abstract corres. to DE 35 19575 [AN 1985-311757].
Derwent Abstract corres. to JP 10-119430 [AN 1998-327366].
Fox T.G., Bull. Am. Physics Soc. 1,3, p. 123 [1956].
Polymer Handbook, 2$^{nd}$ Edition, J. Wiley & Sons, New York (1975).

* cited by examiner

*Primary Examiner*—David Wu
*Assistant Examiner*—Vu Nguyen
(74) *Attorney, Agent, or Firm*—Brooks Kushman P.C.

(57) ABSTRACT

Compositions useful for preparing coating slips for inkjet recording materials include a pulverulent silane-modified fully or partially hydrolyzed polyvinylalcohol and a redispersible polymer powder.

14 Claims, No Drawings

COMPOUND OF A POWDERY COATING AGENT

CROSS-REFERENCE TO RELATED APPLICATIONS

This application claims the benefit of PCT Application No. PCT/EP2004/004233; filed Apr. 21, 2004; which claims priority of German Application Nos. 103 20 629.9 filed May 8, 2003, and 103 21 941.2 filed May 15, 2003.

BACKGROUND OF THE INVENTION

1. Field of the Invention

The invention relates to the use of a powderous coating material composition for coating ink-jet recording materials.

2. Description of the Related Art

Polyvinyl alcohols are used in papercoating slips as cobinders in order to enhance the gloss and whiteness of the papercoating. Coats on paper, especially for ink-jet papers, are exposed to a high mechanical load. The coatings are therefore required to have high abrasion resistance. Moreover, the formulation must ensure effective ink absorption, without the ink drop running.

From DE-A 10232666 it is known that silane-containing polyvinyl alcohols are high-grade binders for coating slips. In DE-A 3519575 a combination of silane-modified polyvinyl alcohol and colloidal silica is recommended as coating material for producing a covering coat for heat-sensitive recording paper. EP-A 1080940 describes a water-resistant coating material composition comprising silane-functional polyvinyl alcohol and titanium chelate complex.

JP-A 10-119430 coats heat-sensitive recording materials using an aqueous solution comprising silane-modified polyvinyl alcohol, an isobutylene-maleic anhydride-maleimide terpolymer, metal salt, and crosslinker. The use of silane-modified polyvinyl alcohol as a papercoating agent is also recommended in U.S. Pat. No. 4,617,239, the silanized polyvinyl alcohol being used in an alkaline aqueous solution in combination if appropriate with an aqueous polymer latex. From EP-A 1127706 an ink-jet recording material is known which is coated with a mixture of an aqueous solution of a silanized polyvinyl alcohol, an aqueous polymer latex, and a pigment dispersion.

A disadvantage of the prior art mixtures is the often inadequate storage stability of the polyvinyl alcohol solutions. When mixtures of polyvinyl alcohol solutions and polymer dispersions are employed it is often not possible to achieve the desired end concentration, owing to the sharp viscosity rise when relatively highly concentrated solutions or dispersions are employed.

An object which existed, therefore, was that of providing a coating material composition for producing coatings on ink-jet recording materials, with which, on both paper-based and polymeric substrate materials, abrasion-resistant coatings are obtained; with which an unwanted rise in viscosity during preparation can be avoided; and with which a greater flexibility is achieved in terms of the solids content of the coating slip.

SUMMARY OF THE INVENTION

The aforementioned objects and other objects are achieved through the use of pulverulent coating compositions comprising pulverulent silane-containing polyvinyl alcohols and water-redispersible polymer powders, generally in conjunction with conventional paper slip ingredients.

DETAILED DESCRIPTION OF THE PREFERRED EMBODIMENTS

The invention provides for the use of a pulverulent coating material composition for coating ink-jet recording materials, comprising
a) one or more pulverulent, silane-containing polyvinyl alcohols based on fully or partly hydrolyzed vinyl ester copolymers having a degree of hydrolysis of 75 to 100 mol %, and
b) one or more water-redispersible polymer powders based on homopolymers or copolymers of one or more monomers from the group consisting of vinyl esters of unbranched or branched alkylcarboxylic acids having 1 to 15 carbon atoms, methacrylic esters and acrylic esters of alcohols having 1 to 15 carbon atoms, vinyl aromatics olefins, dienes, and vinyl halides.

The silane-containing polyvinyl alcohols based on fully or partly hydrolyzed vinyl ester copolymers having a degree of hydrolysis of 75 to 100 mol % are obtainable by means of free-radical addition polymerization of one or more vinyl esters of unbranched or branched alkylcarboxylic acids having 1 to 15 carbon atoms and of one or more silane-containing, ethylenically unsaturated monomers, and also, if desired, further comonomers copolymerizable therewith, and hydrolysis of the resultant polymers.

Suitable silane-containing polyvinyl alcohols are fully or partly hydrolyzed vinyl ester polymers having a degree of hydrolysis of 75 to 100 mol % and a silane-containing comonomer unit fraction of 0.01 to 10 mol %. The fully hydrolyzed vinyl ester polymers have a degree of hydrolysis of preferably 97.5 to 100 mol %, more preferably 98 to 99.5 mol %. The partially hydrolyzed polyvinyl esters have a degree of hydrolysis of preferably 80 to 95 mol %, more preferably 86 to 90 mol %. The Höppler viscosity (according to DIN 53015, as a 4% strength by weight aqueous solution) serves as a measure of the molecular weight and of the degree of polymerization of the partially or fully hydrolyzed, silanized vinyl ester polymers, and is preferably from 2 to 50 mPas.

Suitable vinyl esters are vinyl esters of unbranched or branched carboxylic acids having 1 to 15 carbon atoms. Preferred vinyl esters are vinyl acetate, vinyl propionate, vinyl butyrate, vinyl 2-ethylhexanoate, vinyl laurate, vinyl pivalate, and vinyl esters of α-branched monocarboxylic acids having 5 to 13 carbon atoms, an example being VeoVa9$^R$ or VeoVa10$^R$ (trade names of Shell). Particular preference is given to vinyl acetate.

Suitable ethylenically unsaturated, silane-containing monomers are, for example, ethylenically unsaturated silicon compounds of the general formula $R^1SiR^2_{0-2}(OR^3)_{1-3}$, $R^1$ having the definition $CH_2=CR^4-(CH_2)_{0-3}$ or $CH_2=CR^4CO_2(CH_2)_{1-3}$, $R^2$ having the definition $C_1$ to $C_3$ alkyl radical, $C_1$ to $C_3$ alkoxy radical or halogen, preferably Cl or Br, $R^3$ being an unbranched or branched, optionally substituted alkyl radical having 1 to 12 carbon atoms, preferably 1 to 3 carbon atoms, or being an acyl radical having 2 to 12 carbon atoms, it being possible for $R^3$ to be interrupted if appropriate by an ether group, and $R^4$ being H or $CH_3$.

Further suitable ethylenically unsaturated, silane-containing monomers are silane group comprised meth(acrylamides), of the general formula $CH_2=CR^5-CO-NR^6-R^7-SiR^8_m-(R^9)_{3-m}$, m being 0 to 2, $R^5$ being either H or a methyl group, $R^6$ being H or an alkyl group having 1 to 5 carbon atoms; $R^7$ is an alkylene group having 1 to 5 carbon atoms or a divalent organic group in which the carbon chain is interrupted by an oxygen or nitrogen atom, $R^8$ is an alkyl group having 1 to 5 carbon atoms, $R^9$ is an alkoxy group having 1 to 40 carbon atoms, which may be substituted by further heterocycles. In monomers in which 2 or more $R^5$ or $R^9$ groups occur, these groups may be identical or different.

Examples of such (meth)acrylamido-alkylsilanes are the following: 3-(meth)acrylamido-propyltrimethoxysilanes, 3-(meth)acrylamido-propyltriethoxysilanes, 3-(meth)acrylamido-propyltri(β-methoxyethoxy)silanes, 2-(meth)acrylamido-2-methylpropyltrimethoxysilanes, 2-(meth)acrylamido-2-methylethyltrimethoxysilanes, N-(2-(meth)acrylamidoethyl)aminopropyltrimethoxysilanes, 3-(meth)acrylamidopropyltriacetoxysilanes, 2-(meth)acrylamido-ethyltrimethoxysilanes, 1-(meth)acrylamido-methyltrimethoxysilanes, 3-(meth)acrylamido-propylmethyldimethoxysilanes, 3-(meth)acrylamido-propyldimethylmethoxysilanes, 3-(N-methyl-(meth)acrylamido-propyltrimethoxysilanes, 3-((meth)acrylamido-methoxy)-3-hydroxypropyl-trimethoxysilanes, 3-((meth)acrylamido-methoxy)-propyltrimethoxysilanes, N,N-dimethyl-N-trimethoxysilylpropyl-3-(meth)acrylamido-propylammonium chloride, and N,N-dimethyl-N-trimethoxysilylpropyl-2-(meth)acrylamido-2-methylpropylammonium chloride.

Preferred ethylenically unsaturated, silane-containing monomers are γ-acryloyloxy- and γ-methacryloyloxypropyltri(alkoxy)silanes, α-methacryloyloxymethyltri(alkoxy)silanes, γ-methacryloyloxypropylmethyldi(alkoxy)silanes; vinylsilanes such as vinylalkyldi(alkoxy)silanes and vinyltri(alkoxy)silanes, examples of groups which can be used as alkoxy groups being methoxy, ethoxy, methoxyethylene, ethoxyethylene, methoxypropylene glycol ether and/or ethoxypropylene glycol ether radicals. Examples of preferred silane-containing monomers are 3-methacryloyloxypropyltrimethoxysilane, 3-methacryloyloxypropylmethyldimethoxysilane, vinyltrimethoxysilane, vinylmethyldimethoxysilane, vinyltriethoxysilane, vinylmethyldiethoxysilane, vinyltripropoxysilane, vinyltriisopropoxysilane, vinyltris(1-methoxy)isopropoxysilane, vinyltributoxysilane, vinyltriacetoxysilane, methacryloyloxymethyltrimethoxysilane, 3-methacryloyloxypropyl-tris(2-methoxyethoxy)silane, vinyltrichlorosilane, vinylmethyldichlorosilane, vinyltris(2-methoxyethoxy)silane, trisacetoxyvinylsilane, allylvinyltrimethoxysilane, allyltriacetoxysilane, vinyldimethylmethoxysilane, vinyldimethylethoxysilane, vinylmethyldiacetoxysilane, vinyldimethylacetoxysilane, vinylisobutyldimethoxysilane, vinyltriisopropyloxysilane, vinyltributoxysilane, vinyltrihexyloxysilane, vinylmethoxydihexoxysilane, vinyltrioctyloxysilane, vinyldimethoxyoctyloxysilane, vinylmethoxydioctyloxysilane, vinylmethoxydilauryloxysilane, vinyldimethoxylauryloxysilane, and also polyethylene glycol-modified vinylsilanes. Most-preferred ethylenically unsaturated, silane-containing monomers are vinyltrimethoxysilane, vinylmethyldimethoxysilane, vinyltriethoxysilane, vinylmethyldiethoxysilane, vinyltris(1-methoxy)isopropoxysilane, methacryloyloxypropyl-tris(2-methoxyethoxy)silane, 3-methacryloyloxypropyltrimethoxysilane, 3-methacryloyloxypropylmethyldimethoxysilane, and methacryloyloxymethyltrimethoxysilane and also mixtures thereof, or mixtures of two or more silanes from the group consisting of 3-methacryloyloxypropyltrimethoxysilane, methacryloyloxymethyltrimethoxysilane, vinyltrimethoxysilane, and vinyltriethoxysilane.

The ethylenically unsaturated, silane-containing monomers are copolymerized in an amount of 0.01 to 10.0 mol %, preferably 0.01 to 1.0 mol %.

Besides the silane-containing monomers it is also possible for one or more further comonomers to be copolymerized: 1-alkylvinyl esters such as isopropenyl acetate, ethylene, propylene, isobutylene, butadiene, isoprene, chloroprene, styrene, α-methylstyrene, vinyl chloride, vinylidene chloride, vinyl fluoride, acrylonitrile, methacrylonitrile; alkyl vinyl ethers such as ethyl vinyl ether, n-butyl vinyl ether, isobutyl vinyl ether, tert-butyl vinyl ether, cyclohexyl vinyl ether, octadecyl vinyl ether, hydroxybutyl vinyl ether, cyclohexanedimethanol monovinyl ether; vinyl methyl ketone, N-vinylformamide, N-vinyl-N-methylacetamide, N-vinylcaprolactam, N-vinylpyrrolidone, and N-vinylimidazole. Also suitable are acrylic acid and methacrylic acid and their esters and amides such as methyl (meth)acrylate, ethyl (meth)acrylate, n-butyl (meth)acrylate, isobutyl (meth)acrylate, ethylhexyl (meth)acrylate, benzyl (meth)acrylate, 2-hydroxyethyl (meth)acrylate, hydroxypropyl(meth)acrylate, n-hexyl (meth)acrylate, isooctyl(meth)acrylate, isodecyl(meth)acrylate, lauryl(meth)acrylate, methoxyethyl(meth)acrylate, phenoxyethyl(meth)acrylate, isobornyl (meth)acrylate, stearyl (meth)acrylate, cyclohexyl(meth)acrylate, α-chloroacrylic esters and α-cyanoacrylic esters. Further examples are vinylcarbazole, vinylidene cyanide, vinyl esters, acrylic anhydride, maleic anhydride, maleic and fumaric esters, sulfonic acid-modified monomers such as 2-acrylamido-2-methylpropanesulfonic acid and the alkali metal salts thereof, cationic monomers such as trimethyl-3-(1-(meth)acrylamido-1,1-dimethylpropyl)ammonium chloride, trimethyl-3-(1-(meth)acrylamidopropyl)ammonium chloride, 1-vinyl-2-methylimidazole, and the quaternized compounds thereof.

The silane-containing vinyl ester polymers can be prepared in a known way by means of addition polymerization; preferably by bulk polymerization, emulsion polymerization, suspension polymerization, or by polymerization in organic solvents, more preferably in alcoholic solution. The molecular weight can be set in a way which is known to the skilled worker, by polymerization in the presence of molecular weight regulators. The silane-containing vinyl ester polymers are hydrolyzed in a way which is known per se, by the belt or extruder process, for example, or in a stirred tank, in the alkaline or acidic range, with addition of acid or base. After the end of the hydrolysis the solvent is distilled off and the silane-containing polyvinyl alcohol is obtained as a powder. The aqueous solution of the silane-containing polyvinyl alcohols can if desired also be spray-dried and the silane-containing polyvinyl alcohol recovered as a powder. The preparation of powderous, silane-containing polyvinyl alcohols is described in detail for example in DE-A 10232666. Common drying methods are fluid-bed, thin-film, freeze, and spray drying.

Vinyl esters suitable for the water-redispersible polymer powder b) are those of carboxylic acids having 1 to 15 carbon atoms. Preferred vinyl esters are vinyl acetate, vinyl propionate, vinyl butyrate, vinyl 2-ethylhexanoate, vinyl laurate, 1-methylvinyl acetate, vinyl pivalate, and vinyl esters of α-branched monocarboxylic acids having 9 to 13 carbon atoms, an example being VeoVa9$^R$ or VeoVa10$^R$ (trade names of Shell). Particular preference is given to vinyl acetate.

Suitable methacrylic esters or acrylic esters are esters of unbranched or branched alcohols having 1 to 15 carbon atoms, such as methyl acrylate, methyl methacrylate, ethyl acrylate, ethyl methacrylate, propyl acrylate, propyl methacrylate, n-butyl acrylate, n-butyl methacrylate, 2-ethylhexyl acrylate, and norbornyl acrylate. Preference is given to methyl acrylate, methyl methacrylate, n-butyl acrylate, and 2-ethylhexyl acrylate.

Examples of olefins and dienes are ethylene, propylene, and 1,3-butadiene. Suitable vinyl aromatics are styrene and vinyltoluene. A suitable vinyl halide is vinyl chloride.

If desired it is possible additionally to copolymerize 0.05% to 50% by weight, preferably 1% to 10% by weight, based on the total weight of the base polymer, of auxiliary monomers. Examples of auxiliary monomers are ethylenically unsaturated monocarboxylic and dicarboxylic acids, preferably acrylic acid, methacrylic acid, fumaric acid, and maleic acid; ethylenically unsaturated carboxamides and carbonitriles, preferably acrylamide and acrylonitrile; monoesters and diesters of fumaric acid and maleic acid, such as the diethyl and diisopropyl esters, and also maleic anhydride, ethylenically unsaturated sulfonic acids and their salts, preferably vinylsulfonic acid, and 2-acrylamido-2-methylpropanesulfonic acid. Further examples are precrosslinking comonomers such as polyethylenically unsaturated comonomers, an example being divinyl adipate, diallyl maleate, allyl methacrylate or triallyl cyanurate, or postcrosslinking comonomers, examples being acrylamidoglycolic acid (AGA), methylacrylamidoglycolic acid methyl ester (MAGME), N-methylolacrylamide (NMA), N-methylolmethacrylamide (NMMA), N-methylolallylcarbamate, alkyl ethers such as the isobutoxy ether or esters of N-methylolacrylamide, of N-methylolmethacrylamide, and of N-methylolallylcarbamate. Also suitable are epoxide-functional comonomers such as glycidyl methacrylate and glycidyl acrylate. Further examples are silicon-functional comonomers, such as acryloyloxypropyltri(alkoxy)- and methacryloyloxypropyltri(alkoxy)-silanes, vinyltrialkoxysilanes, and vinylmethyldialkoxysilanes, examples of alkoxy groups that can be present being methoxy, ethoxy, and ethoxypropylene glycol ether radicals. Mention may also be made of monomers containing hydroxyl or Co groups, examples being methacrylic and acrylic acid hydroxyalkyl esters such as hydroxyethyl, hydroxypropyl or hydroxybutyl acrylate or methacrylate, and also compounds such as diacetoneacrylamide and acetylacetoxyethyl acrylate or methacrylate.

Examples of suitable homopolymers and copolymers are vinyl acetate homopolymers, copolymers of vinyl acetate with ethylene, copolymers of vinyl acetate with ethylene and one or more further vinyl esters, copolymers of vinyl acetate with ethylene and acrylic ester, copolymers of vinyl acetate with ethylene and vinyl chloride, styrene-acrylic ester copolymers, and styrene-1,3-butadiene copolymers.

Preference is given to vinyl acetate homopolymers; copolymers of vinyl acetate with 1% to 40% by weight of ethylene; copolymers of vinyl acetate with 1% to 40% by weight of ethylene and 1% to 50% by weight of one or more further comonomers from the group consisting of vinyl esters having 1 to 12 carbon atoms in the carboxylic acid radical such as vinyl propionate, vinyl laurate, and vinyl esters of α-branched carboxylic acids having 9 to 13 carbon atoms such as VeoVa9, VeoVa10, and VeoVa11; copolymers of vinyl acetate, 1% to 40% by weight of ethylene, and, preferably, 1% to 60% by weight of acrylic esters of unbranched or branched alcohols having 1 to 15 carbon atoms, especially n-butyl acrylate or 2-ethylhexyl acrylate; and copolymers with 30% to 75% by weight of vinyl acetate, 1% to 30% by weight of vinyl laurate or vinyl esters of an α-branched carboxylic acid having 9 to 11 carbon atoms, and 1% to 30% by weight of acrylic esters of unbranched or branched alcohols having 1 to 15 carbon atoms, especially n-butyl acrylate or 2-ethylhexyl acrylate, which additionally contain 1% to 40% by weight of ethylene; copolymers with vinyl acetate, 1% to 40% by weight of ethylene, and 1% to 60% by weight of vinyl chloride; it being possible for the polymers additionally to include the stated auxiliary monomers in the stated amounts, and the figures in % by weight adding up in each case to 100% by weight.

Preference is also given to (meth)acrylic ester polymers, such as copolymers of n-butyl acrylate or 2-ethylhexyl acrylate or copolymers of methyl methacrylate with n-butyl acrylate and/or 2-ethylhexyl acrylate; styrene-acrylic ester copolymers with one or more monomers from the group consisting of methyl acrylate, ethyl acrylate, propyl acrylate, n-butyl acrylate, and 2-ethylhexyl acrylate; vinyl acetate-acrylic ester copolymers with one or more monomers from the group consisting of methyl acrylate, ethyl acrylate, propyl acrylate, n-butyl acrylate, 2-ethylhexyl acrylate, and, if desired, ethylene; styrene-1,3-butadiene copolymers; it being possible for the polymers additionally to contain the stated auxiliary monomers in the stated amounts, and the figures in % by weight adding up in each case to 100% by weight.

The monomer selection and the selection of the weight fractions of comonomers are made so as to result in general in a glass transition temperature Tg of −50° C. to +120° C., preferably −30° C. to +95° C. The glass transition temperature Tg of the polymers can be determined in conventional manner by means of differential scanning calorimetry (DSC). The Tg can also be calculated approximately in advance by means of the Fox equation. According to Fox T. G., Bull. Am. Physics Soc. 1, 3, page 123 (1956) the following relationship applies: $1/Tg = x1/Tg1 + x2/Tg2 + \ldots + xn/Tgn$, xn standing for the mass fraction (% by weight/100) of the monomer n, and Tgn being the glass transition temperature in kelvins of the homopolymer of the monomer n. Tg values for homopolymers are listed in Polymer Handbook, $2^{nd}$ edition, J. Wiley & Sons, New York (1975).

The homopolymers and copolymers are prepared in a manner known to the skilled worker, by bulk polymerization, solution polymerization, precipitation polymerization, suspension polymerization, and emulsion polymerization. Preference is given to solution, suspension, and emulsion polymerization.

The polymerization temperature is generally 40° C. to 100° C., preferably 60° C. to 90° C. In the case of the copolymerization of gaseous comonomers such as ethylene, 1,3-butadiene or vinyl chloride it is also possible to operate under superatmospheric pressure, generally at between 5 bar and 100 bar. The polymerization can be initiated using the customary water-soluble or monomer-soluble initiators or redox initiator combinations. Examples of water-soluble initiators are the sodium, potassium, and ammonium salts of peroxodisulfuric acid, hydrogen peroxide, t-butyl peroxide, potassium peroxodiphosphate, t-butyl peroxopivalate, cumene hydroperoxide, isopropylbenzene monohydroperoxide, and azobisisobutyronitrile. Examples of monomer-soluble initiators are dicetyl peroxydicarbonate, dicyclohexyl peroxydicarbonate, dibenzoyl peroxide, tert-butyl peroxyneodecanoate, tert-butyl peroxy-2-ethylhexanoate, and tert-butyl peroxypivalate. The stated initiators are used generally in an amount of 0.01% to 10.0% by weight, preferably 0.1% to 0.5% by weight, based in each case on the total weight of the monomers. Redox initiators used are combinations of the stated initiators in combination with reducing agents. Suitable reducing agents are the sulfites and bisulfites of alkali metals and of ammonium, an example being sodium sulfite, the derivatives of sulfoxylic acid such as zinc or alkali metal formaldehyde sulfoxylates, sodium hydroxymethanesulfinate for example, and ascorbic acid. The amount of reducing agent is generally 0.01% to 10.0% by weight, preferably 0.1% to 0.5% by weight, based in each case on the total weight of the monomers.

In the case of the processes of the suspension and emulsion polymerization, stated as being preferred, polymerization takes place in the presence of surface-active substances such as protective colloids and/or emulsifiers. Examples of suitable protective colloids are partially hydrolyzed polyvinyl alcohols, polyvinylpyrrolidones, polyvinyl acetals, starches, celluloses, and their carboxymethyl, methyl, hydroxyethyl, and hydroxypropyl derivatives. Suitable emulsifiers are anionic, cationic, and nonionic emulsifiers, examples being anionic surfactants, such as alkyl sulfates having a chain length of 8 to 18 carbon atoms, alkyl or alkylaryl ether sulfates having 8 to 18 carbon atoms in the hydrophobic radical and up to 60 ethylene oxide or propylene oxide units, alkyl- or alkylaryl sulfonates having 8 to 18 carbon atoms, esters and monoesters of sulfosuccinic acid with monohydric alcohols or alkylphenols, or nonionic surfactants such as alkyl polyglycol ethers or alkylaryl polyglycol ethers having up to 60 ethylene oxide and/or propylene oxide units.

The monomers can be included in their entirety in the initial charge, metered in their entirety, or included in fractions in the initial charge, with the remainder metered in after the polymerization has been initiated. The metered feeds can be made separately (in terms of both space and time) or some or all of the components to be metered can be metered in pre-emulsified form.

After the end of the polymerization it is possible to carry out postpolymerization for the purpose of removing residual monomers, employing known methods: for example, by means of postpolymerization initiated with redox catalyst. Volatile residual monomers can also be removed by means of distillation, preferably under reduced pressure, and, if desired, by passing inert entraining gases such as air, nitrogen or steam through or over the reaction mixture. The aqueous polymer dispersions have a solids content of 30% to 75% by weight, preferably of 50% to 60% by weight.

To prepare the polymer powders the aqueous dispersions, following addition of protective colloids as spraying aids if desired, are dried, by means of fluid-bed drying, freeze drying or spray drying, for example. The dispersions are preferably spray-dried. Spray drying in this case takes place in customary spray-drying units, it being possible for the atomization to take place by means of single-fluid, two-fluid or multi-fluid nozzles or using a rotating disk. The exit temperature chosen is generally in the range from 45° C. to 120° C., preferably 60° C. to 90° C., depending on unit, resin Tg, and desired degree of drying.

In the case of drying to form water-redispersible polymer powders it is usual to use a spraying aid in a total amount of 3% to 30% by weight, based on the polymeric constituents of the dispersion. In other words, the total amount of protective colloid prior to the drying operation should be at least 3% to 30% by weight, based on the polymer fraction; it is preferred to use 5% to 20% by weight based on the polymer fraction.

Suitable spraying aids are partially hydrolyzed polyvinyl alcohols; polyvinylpyrrolidones; polysaccharides in water-soluble form such as starches (amylose and amylopectin), celluloses and their carboxymethyl, methyl, hydroxyethyl, and hydroxypropyl derivatives; proteins such as casein or caseinate, soya protein, gelatin; ligninsulfonates; synthetic polymers such as poly(meth)acrylic acid, copolymers of (meth)acrylates with carboxyl-functional comonomer units, poly(meth)acrylamide, polyvinylsulfonic acids and water-soluble copolymers thereof; melamineformaldehydesulfonates, naphthalene-formaldehydesulfonates, styrene-maleic acid copolymers, and vinyl ether-maleic acid copolymers. Preference is given to using no protective colloids other than polyvinyl alcohols as spraying aids.

In the course of the spraying operation an amount of up to 1.5% by weight of antifoam, based on the base polymer, has proven favorable in numerous instances. In order to increase the shelf life by improving the blocking stability, particularly in the case of powders with a low glass transition temperature, the powder obtained can be furnished with an antiblocking (anticaking) agent, up to 3 times the amount, but preferably up to 30% by weight, based on the total weight of polymeric constituents. Examples of antiblocking agents are Ca and Mg carbonate, talc, gypsum, silica, kaolins, and silicates having particle sizes preferably in the range from 10 nm to 10 μm.

The viscosity of the spray feed is adjusted via the solids content so as to give a value of <500 mPas (Brookfield viscosity at 20 revolutions and 23° C.), preferably <250 mPas. The solids content of the dispersion for spraying is >15%, preferably >25%.

The pulverulent coating material composition can be produced by mixing the pulverulent components a) and b). In one preferred embodiment the pulverulent coating material composition is produced by jointly drying the aqueous solution of the silane-containing polyvinyl alcohol a) and the aqueous polymer dispersion of polymer b), following addition of protective colloid if appropriate, said joint drying taking place with particular preference by a spray-drying process.

Components a) and b) are used in a weight ratio (solids/solids) of 99:1 to 1:99, preferably of 95:5 to 20:80, more preferably of 85:15 to 50:50, and most preferably of 60:40 to 30:70.

The products produced in accordance with the invention are used in formulas for coating substrate materials, comprising paper or polymeric film, for ink-jet recording materials, examples being ink-jet paper and ink-jet foils. Examples of suitable substrate materials are paper, polymer-coated paper, such as polyethylene-, polypropylene- or PET-coated paper, and cellulose acetate foils, polyester foils such as PET foil, polyamide, polycarbonate, polyolefin, polyimide, polyamide, polyvinyl acetal, polyether, and polysulfonamide foils.

Besides components a) and b) the coating materials may if desired include further binders and additives for the formulation of coatings for substrate materials for ink-jet recording materials, or may be used in conjunction with further binders and additives for formulating coatings for substrate materials for ink-jet recording materials.

Typical further additives and binders are the following: cationic dispersants such as polydiallyldimethylammonium chloride, benzyldimethylstearylammonium chloride, dimethylstearylammonium chloride, copolymers with acrylamide, dimethylamine-epichlorohydrin, polyoxyalkyl-polyamine-dicyanodiamine, dimethylaminoethyl methacrylate (MADAME) modified polymers, methacryloyloxyethyltrimethylammonium chloride (MADQUAT) modified polymers, cationic cellulose derivatives, cationic starch derivatives, cationic polyvinyl alcohols, polyethylenimine and its copolymers, compounds with trivalent aluminum ions, boron ions, and zinc ions, triethanolamine-titanium chelate complex, copolymers of vinylpyrrolidones, and polyamidoamines.

Binders such as hydroxyethylcellulose, starch, gelatin, casein, polyvinylpyrrolidones, dextran, dextrin, polyethylene glycols, agar, carrageenan, and xanthan. Plasticizers such as ethylene glycol, diethylene glycol, propylene glycol, polyethylene glycol, glycerol, glycerol monomethyl ether, glycerol monochlorohydrin, ethylene carbonate, propylene carbonate, tetrachlorophthalic anhydride, tetrabromophthalic anhydride, urea, urea phosphate, triphenyl phosphate, glycerol monostearate, propylene glycol monostearate, tetramethylene sulfone, N-methyl-2-pyrrolidone, N-vinyl-2-pyrrolidone, and sorbitol. Pigments and fillers such as silica, calcium carbonate, clay, bentonite, alumina, titanium oxide. Defoamers and dispersing assistants such as polydiallyldimethylammonium chloride, benzyldimethylstearylammonium chloride, and dimethylstearylammonium chloride, and also leveling agents, shading dye, wetting agents, viscosity stabilizers, pH regulators, curing agents, UV absorbers, oxidation inhibiter, optical brighteners, and dye-fixing agents.

The formulas for coating slips for paper and polymeric substrate materials are known to the skilled worker. To prepare the coating slips the pulverulent coating material composition is taken up together or in separate steps with the other constituents of the formula in the requisite amount of water.

EXAMPLES

Paper Coating:

Example 1

Product from joint spray drying of 70% by weight (solids) of a silane-containing fully hydrolyzed polyvinyl alcohol having a Höppler viscosity of 6 mPas (4% strength in water) and 30% by weight (solids) of a polyvinyl alcohol-stabilized, functionalized polyvinyl acetate dispersion, having a particle size of 1 μm, a solids content of 45%, and a Brookfield viscosity of 500 mPas (20 rpm)

Example 2

As in Example 1, the silane-containing polyvinyl alcohol having a Höppler viscosity of 10 mPas (4% strength in water).

Example 3

Powder-powder mixture in a weight ratio of 70:30 of a silane-containing fully hydrolyzed polyvinyl alcohol having a Höppler viscosity of 20 mPas (4% strength in water) and a redispersible polymer powder, prepared from a polyvinyl alcohol-stabilized, functionalized polyvinyl acetate dispersion, having a particle size of 1 μm, a solids content of 45%, and a Brookfield viscosity of 500 mPas (20 rpm).

Example 4

As in Example 1, with additionally a cationic dispersant being added to the feed for spray drying. The cationic dispersant was admixed in a weight ratio of component a)+b) to dispersant of 40:5. The product was employed in the coating slip with 45 parts by weight of powder mixture and without additional cationic dispersant.

Comparative Example 5

Commercial silane-containing polyvinyl alcohol having a Höppler viscosity of 25 mPas (4% strength in water).

Comparative Example 6

Redispersible polymer powder produced from a polyvinyl alcohol-stabilized, functionalized polyvinyl acetate dispersion, having a particle size of 1 μm, a solids content of 45%, and a Brookfield viscosity of 500 mPas (20 rpm).

Comparative Example 7

Mixture of an aqueous, 11% strength by weight solution of a silane-containing, fully hydrolyzed polyvinyl alcohol having a Höppler viscosity of 20 mPas (4% strength in water) and a 45% by weight polyvinyl alcohol-stabilized functionalized polyvinyl acetate dispersion, having a particle size of 1 μm and a Brookfield viscosity of 500 mPas (20 rpm).

The products from the inventive and comparative examples were tested in the following formula for papercoating slips:

| Precipitated silica | 100 parts by weight |
| Mixture from inv./comp. example | 40 parts by weight |
| Cationic dispersant | 5 parts by weight |
| Coating slip solids content: | 30% |

Base Paper:

Sized paper at 80 g/m²; coatweight 15 g/m²

Test Methods:

Scrub Test:

A coated paper strip 4.5 cm wide and 19 cm long was exposed to 50 side-to-side strokes in a scrub tester from Prüfbau (system Dr. Dürner) with a black drawing paper applied to a stamp (500 g). The resulting black paper was then assessed visually, the rating 1 (=100% black; no abrasion) representing the optimum.

Brightness:

The brightness was determined by means of reflectance measurement using a filter (R 457) and was assessed visually, the rating 1 representing the optimum.

Test Results:

| | Coat analysis | | | | | | |
| --- | --- | --- | --- | --- | --- | --- | --- |
| | Ex. 1 | Ex. 2 | Ex. 3 | Ex. 4 | Comp. ex. 5 | Comp. ex. 6 | Comp. ex. 7 |
| Scrub test | 1 | 1 | 1 | 1 | 2 | 5 | *) |
| Brightness R457 | 5.1 | 5.2 | 5.1 | 5.1 | 5.6 | 12.3 | *) |

*) With the solutions employed it was not possible to prepare a coating slip having a solids content of 30% by weight. A solution of the modified polyvinyl alcohol at higher concentration was no longer stable on storage.

Coating Plastics:

Example 8

Product from joint spray drying of 42% by weight (solids) of a silane-containing fully hydrolyzed polyvinyl alcohol having a Höppler viscosity of 6 mPas (4% strength in water) and 58% by weight (solids) of a polyvinyl alcohol-stabilized, functionalized polyvinyl acetate dispersion, having a particle size of 1 μm, a solids content of 45%, and a Brookfield viscosity of 500 mPas (20 rpm).

Example 9

As in Example 8, the silane-containing polyvinyl alcohol having a Höppler viscosity of 10 mPas (4% strength in water).

Example 10

Powder-powder mixture in a weight ratio of 42:58 of a silane-containing fully hydrolyzed polyvinyl alcohol having a Höppler viscosity of 20 mPas (4% strength in water) and a redispersible polymer powder, prepared from a polyvinyl alcohol-stabilized, functionalized polyvinyl acetate dispersion, having a particle size of 1 μm, a solids content of 45%, and a Brookfield viscosity of 500 mPas (20 rpm).

Example 11

As in Example 8, with additionally a cationic dispersant being added to the feed for spray drying. The cationic dispersant was admixed in a weight ratio of component a)+b) to dispersant of 85:8. The product was employed in the coating slip with 93 parts by weight of powder mixture and without additional cationic dispersant.

Comparative Example 12

Commercial silane-containing polyvinyl alcohol having a Höppler viscosity of 10 mPas (4% strength in water).

Comparative Example 13

Redispersible polymer powder produced from a polyvinyl alcohol-stabilized, functionalized polyvinyl acetate dispersion, having a particle size of 1 μm, a solids content of 45%, and a Brookfield viscosity of 500 mPas (20 rpm).

Comparative Example 14

Mixture of an aqueous, 11% strength by weight solution of a silane-containing, fully hydrolyzed polyvinyl alcohol having a Höppler viscosity of 20 mPas (4% strength in water) and a 45% by weight polyvinyl alcohol-stabilized functionalized polyvinyl acetate dispersion, having a particle size of 1 μm and a Brookfield viscosity of 500 mPas (20 rpm).

The products from the inventive and comparative examples were tested in the following formula for coating slips:

| | |
|---|---|
| Precipitated silica | 100 parts by weight |
| Mixture from inv./comp. example | 85 parts by weight |
| Cationic dispersant | 8 parts by weight |
| Coating slip solids content: | 30% |

Substrate:

PET film with adhesion promoter at 90 g/m²; coatweight 15 g/m²

Test Methods:

Scrub Test:

A coated film strip 4.5 cm wide and 19 cm long was exposed to 50 side-to-side strokes in a scrub tester from Prüfbau (system Dr. Dürner) with a black drawing paper applied to a stamp (500 g). The resulting black paper was then assessed visually, the rating 1 (=100% black; no abrasion) representing the optimum.

Brightness:

The brightness was determined by means of reflectance measurement using a filter (R 457) and was assessed visually, the rating 1 representing the optimum.

Test Results:

| | Coat analysis | | | | | | |
|---|---|---|---|---|---|---|---|
| | Ex. 8 | Ex. 9 | Ex. 10 | Ex. 11 | Comp. ex. 12 | Comp. ex. 13 | Comp. ex. 14 |
| Scrub test | 1 | 1 | 1 | 1 | 3 | 5 | *) |
| Brightness R457 | 5.4 | 5.3 | 5.2 | 5.3 | 7.5 | 11.8 | *) |

*) With the solutions employed it was not possible to prepare a coating slip having a solids content of 30% by weight. A solution of the modified polyvinyl alcohol at higher concentration was no longer stable on storage.

The invention claimed is:

1. A process for coating an inkjet-recording substrate comprising applying a coating prepared from a pulverulent coating material composition comprising
   a) one or more pulverulent, silane-containing polyvinyl alcohols based on fully or partly hydrolyzed vinyl ester copolymers having a degree of hydrolysis of 75 to 100 mol %, and
   b) one or more water-redispersible polymer powders based on homopolymers or copolymers of one or more monomers selected from the group consisting of vinyl esters of unbranched or branched alkylcarboxylic acids having 1 to 15 carbon atoms, methacrylic esters and acrylic esters of alcohols having 1 to 15 carbon atoms, vinyl aromatics, olefins, dienes, and vinyl halides, wherein the silane-containing polyvinyl alcohols are obtained by copolymerization of 0.01 to 10 mol % of one or more silane-containing comonomers selected from the group consisting of ethylenically unsaturated silicon compounds of the formula $R^1SiR^2_{0-2}(OR^3)_{1-3}$, and silane group comprised meth(acrylamides), of the general formula $CH_2=CR^5—CO—NR^6—R^7—SiR^8_m—(R^9)_{3-m}$, wherein $R^1$ is $CH_2=CR^4—(CH_2)_{0-3}$ or $CH_2=CR^4CO_2(CH_2)_{1-3}$, $R^2$ is a $C_1$ to $C_3$ alkyl radical, $C_1$ to $C_3$ alkoxy radical or halogen, $R^3$ is an unbranched or branched, optionally substituted alkyl radical having 1 to 12 carbon atoms, or an acyl radical having 2 to 12 carbon atoms, $R^3$ optionally interrupted by an ether group, $R^4$ is H or $CH_3$, and m is 0 to 2, $R^5$ is H or a methyl group, $R^6$ is H or an alkyl group having 1 to 5 carbon atoms, $R^7$ is an alkylene group having 1 to 5 carbon atoms or a divalent organic group in which the carbon chain is interrupted by an oxygen or nitrogen atom, $R^8$ is an alkyl group having 1 to 5 carbon atoms, and $R^9$ is an alkoxy group having 1 to 40 carbon atoms, which may be substituted by further heteroatoms.

2. The process of claim 1, wherein
   a) one or more pulverulent, silane-containing polyvinyl alcohols based on fully or partially hydrolyzed vinyl acetate copolymers are present.

3. The process of claim 1, wherein b) one or more water-redispersible polymer powders are homopolymers or copolymers selected from the group consisting of vinyl acetate homopolymers, copolymers of vinyl acetate with ethylene, copolymers of vinyl acetate with ethylene and one or more further vinyl esters, copolymers of vinyl acetate with ethylene and acrylic ester, copolymers of vinyl acetate with ethylene and vinyl chloride, styrene-acrylic ester copolymers, and styrene-1,3-butadiene copolymers, each of said polymers or copolymers optionally containing one or more auxiliary monomers.

4. The process of claim 3, wherein the homopolymers or copolymers additionally contain one or more auxiliary monomers selected from the group consisting of b) ethylenically unsaturated monocarboxylic and dicarboxylic acids, ethylenically unsaturated carboxamides and carbonitriles, monoesters and diesters of fumaric acid and maleic acid, maleic anhydride, ethylenically unsaturated sulfonic acids and their salts, polyethylenically unsaturated comonomers, acrylamidoglycolic acid (AGA), methylacrylamidoglycolic acid methyl ester (MAGME), N-methylolacrylamide (NMA), N-methylolmethacrylamide (NMMA), N-methylolallylcarbamate, alkyl ethers or esters of N-methylolacrylamide, of N-methylolmethacrylaniide, and of N-methylolallylcarbamate, glycidyl (meth)acrylate, (meth)acryloyloxypropyltri(alkoxy)silanes vinyltrialkoxysilanes, and vinylmethyldialkoxysilanes whose alkoxy groups are selected from the group consisting of methoxy, ethoxy, and ethoxypropylene glycol ether radicals, (meth)acrylic acid hydroxyalkyl esters, diacetoneacrylamide, and acetylacetoxyethyl (meth)acrylate.

5. The process of claim 1, wherein the pulverulent coating material composition is prepared by jointly drying an aqueous solution of the silane-containing polyvinyl alcohol a) and an aqueous polymer dispersion of the polymer b), optionally following addition of protective colloid.

6. The process of claim 5, wherein the joint drying takes place by a spray-drying process.

7. The process of claim 1, wherein components a) and b) are present in a weight ratio (solids/solids) of 95:5 to 20:80.

8. The process of claim 1, wherein the substrate comprises paper, polymer-coated paper, or polymeric film ink-jet recording materials.

9. The process of claim 1, wherein the coating is a coating slip composition comprising
  a) one or more pulverulent, silane-containing polyvinyl alcohols based on fully or partly hydrolyzed vinyl ester copolymers having a degree of hydrolysis of 75 to 100 mol %,
  b) one or more water-redispersible polymer powders based on homopolymers or copolymers of one or more monomers selected from the group consisting of vinyl esters of unbranched or branched alkylcarboxylic acids having 1 to 15 carbon atoms, methacrylic esters and acrylic esters of alcohols having 1 to 15 carbon atoms, vinyl aromatics, olefins, dienes, and vinyl halides,
  c) filler,
  d) a dispersant, and
  e) water.

10. The process of claim 9, wherein the solids content of the coating slip composition is about 30% or more.

11. The process of claim 9, wherein said dispersant is a cationic dispersant.

12. The process of claim 9, wherein the coating slip composition further comprises at least one shading dye, pigment, or mixture thereof.

13. The process of claim 9, wherein at least one said filler is selected from the group consisting of silica, calcium carbonate, clay, bentonite, alumina, and titanium dioxide.

14. The process of claim 9 wherein silica is present as a filler.

* * * * *